(12) United States Patent
Sommer

(10) Patent No.: US 11,447,345 B2
(45) Date of Patent: Sep. 20, 2022

(54) CONNECTING DEVICE FOR CONNECTING A SCREW MACHINE TO A GEAR MECHANISM, AND METHOD FOR CLEANING SUCH A CONNECTING DEVICE

(71) Applicant: Coperion GmbH, Stuttgart (DE)

(72) Inventor: Daniel Sommer, Stuttgart (DE)

(73) Assignee: Coperion GmbH, Stuttgart (DE)

( * ) Notice: Subject to any disclaimer, the term of this patent is extended or adjusted under 35 U.S.C. 154(b) by 351 days.

(21) Appl. No.: 16/690,301

(22) Filed: Nov. 21, 2019

(65) Prior Publication Data

US 2020/0156881 A1 May 21, 2020

(30) Foreign Application Priority Data

Nov. 21, 2018 (EP) ..................................... 18207607

(51) Int. Cl.
*B65G 45/22* (2006.01)
*B65G 33/14* (2006.01)
*B65G 33/34* (2006.01)

(52) U.S. Cl.
CPC ............. *B65G 45/22* (2013.01); *B65G 33/14* (2013.01); *B65G 33/34* (2013.01); *B65G 2201/04* (2013.01)

(58) Field of Classification Search
None
See application file for complete search history.

(56) References Cited

U.S. PATENT DOCUMENTS

| 3,752,398 | A | * | 8/1973 | Svensson | ................ B05B 15/50 239/106 |
| 6,153,093 | A | * | 11/2000 | Bentivoglio | ........ B29C 48/2554 425/197 |
| 6,164,811 | A | * | 12/2000 | Planeta | ............... B29C 48/2561 366/100 |
| 2010/0220549 | A1 | * | 9/2010 | Holdsworth | ........... B65G 53/48 366/167.1 |

FOREIGN PATENT DOCUMENTS

DE    10 2006 022 646 A1    11/2007

* cited by examiner

*Primary Examiner* — Kavel Singh
(74) *Attorney, Agent, or Firm* — Wood Herron & Evans LLP

(57) ABSTRACT

A connecting device for connecting a screw machine to a gear mechanism comprises a housing which in regions delimits an interior. The interior serves for the arrangement of at least one shaft connection between at least one gear shaft and at least one screw shaft. The connecting device comprises at least one cleaning element for cleaning contaminants from the interior. The connecting device allows simple, efficient and reliable cleaning of contaminants from the interior.

16 Claims, 5 Drawing Sheets

CONNECTING DEVICE FOR CONNECTING A SCREW MACHINE TO A GEAR MECHANISM, AND METHOD FOR CLEANING SUCH A CONNECTING DEVICE

CROSS-REFERENCE TO RELATED APPLICATIONS

This application claims the priority of European Patent Application Serial No. EP 18 207 607.5 filed on Nov. 21, 2018, pursuant to 35 U.S.C. 119(a)-(d), the content of which is incorporated herein by reference in its entirety as if fully set forth herein.

FIELD OF THE INVENTION

The invention concerns a connecting device for connecting a screw machine to a gear mechanism, and a method for cleaning such a connecting device.

BACKGROUND OF THE INVENTION

DE 10 2006 022 646 A1 describes a system for preparing bulk product used in the pharmaceutical sector. The system comprises a screw machine which is driven by an electric drive motor via a gear mechanism. The screw machine is connected to the gear mechanism via a connecting device known as a gear lantern.

Such a gear lantern usually comprises a housing containing the shaft connections between the screw shafts of the screw machine and the gear shafts of the gear mechanism. Since very fine powder is processed as a bulk product in the pharmaceutical sector, undesirable contamination of the screw machine and gear lantern occurs.

SUMMARY OF THE INVENTION

The invention is based on the object of creating a connecting device for connecting a screw machine with a gear mechanism, which can be cleaned easily, efficiently and reliably.

This object is achieved by a connecting device for connecting a screw machine to a gear mechanism, comprising a housing, which at least in regions delimits an interior for arrangement of at least one shaft connection between at least one gearbox shaft and at least one screw shaft, which comprises at least one gear-side housing opening for insertion of the at least one gear shaft and at least one machine-side housing opening for insertion of the at least one screw shaft into the interior, and at least one cleaning element for cleaning contaminants from the interior. According to the invention, the connecting device comprises at least one cleaning element for cleaning the interior and/or an inner wall delimiting the interior. The at least one cleaning element is integrated in the connecting device, so that contaminants which enter the interior during operation of the screw machine can be removed in a simple, efficient and reliable fashion by means of the at least one cleaning element.

In particular, the connecting device comprises a supply device which is connected to the at least one cleaning element for supplying a cleaning fluid, for example a cleaning liquid. The supply device allows a supply of cleaning fluid to the at least one cleaning element.

The interior is delimited by the inner wall, which is formed by the housing and the components of the connecting device arranged in the housing, such as for example tie rod covers. Preferably, a seal is provided at the at least one machine-side housing opening and/or at the at least one gear-side housing opening, for sealing a gap between the at least one screw shaft and the housing and/or a gap between the at least one gear shaft and the housing.

The connecting device is also known as a gear lantern. The connecting device is used in particular in the pharmaceutical sector. Cleaning is carried out in particular on a change of bulk product to be prepared or on a product change.

A connecting device, wherein the at least one cleaning element is arranged in the interior, guarantees simple, efficient and reliable cleaning. The at least one cleaning element is preferably formed as a cleaning nozzle. The at least one cleaning element is sealed relative to the housing and/or integrated in the housing, so that via the at least one cleaning element, a cleaning fluid, in particular a cleaning liquid, can be supplied to the interior.

A connecting device, wherein the at least one cleaning element comprises a spray nozzle for spraying a cleaning fluid into the interior, guarantees a simple, efficient and reliable cleaning. Because the at least one cleaning element comprises or is formed as a spray nozzle, the interior and/or the inner wall delimiting the interior can be rinsed by means of the cleaning liquid. The cleaning liquid is in particular water. Preferably, the spray nozzle is formed as a rotary spray nozzle. The rotary spray nozzle produces a spray cone for rinsing the interior. The pressure of the cleaning liquid or the pressure of the water sets the spray cone in rotation so that the cleaning liquid wets the interior or the inner wall delimiting the interior. Thus all contaminants, in particular dust, are wetted with the cleaning liquid or water and rinsed out or rinsed away. The operating personnel are protected. Preferably, the spray nozzle is arranged on a housing floor. Thus the cleaning fluid is supplied to the interior against the force of gravity, whereby thorough cleaning is achieved. The connecting device comprises for example precisely one spray nozzle.

A connecting device, wherein a discharge opening for discharging contaminants from the interior is formed in the housing, guarantees a simple, efficient and reliable cleaning. The contaminants cleaned by means of the at least one cleaning element can easily be discharged from the interior through the discharge opening. Preferably, a container is connected to the discharge opening. The contaminants and/or cleaning liquid are collected in the container. The container is in particular part of a circulation system which separates contaminants from the cleaning fluid and prepares the cleaning fluid for resupply to the interior. For discharge, the discharge opening may in particular be connected to a discharge pump.

A connecting device, wherein the discharge opening is formed in a housing floor, guarantees a simple, efficient and reliable cleaning. Because the discharge opening is formed in the housing floor, the removed contaminants—in particular together with the cleaning liquid—are discharged from the interior under force of gravity. Preferably, the housing floor is formed sloping at least in regions such that under force of gravity, the cleaning liquid together with the removed contaminants runs towards the discharge opening. Thus contaminants can easily be discharged into a container which is connected to the discharge opening.

A connecting device, wherein at least one pressure setting opening is formed in the housing for setting a pressure in the interior, guarantees a simple, efficient and reliable cleaning. Via the at least one pressure setting opening, a desired pressure can be set in the interior. Via the at least one pressure setting opening, firstly a desirable reduced pressure can be created in the interior in order to prevent the escape of contaminants or dust from the interior into the environment. Secondly, an undesirable reduced pressure caused by the discharge of contaminants from the interior via a discharge opening may be compensated. The at least one pressure setting opening is in particular formed spaced from a housing floor in the direction of gravity. For example, the at least one pressure setting opening is formed in a housing side wall and/or on a housing cover wall. This prevents an undesirable drainage of cleaning liquid with contaminants via the at least one pressure setting opening.

A connecting device, wherein the at least one pressure setting opening is connected to a pressure setting device, guarantees a simple, efficient and reliable cleaning. By means of the pressure setting device, the pressure in the interior can be set in a simple fashion through the at least one pressure setting opening. Thus a desirable reduced pressure is created, which firstly prevents contaminants from the interior from reaching the environment, and secondly ensures that contaminants from the process part of the screw machine are not drawn into the interior. The pressure setting device in particular comprises a pump. Preferably, the pressure setting device comprises a pressure sensor for measuring the pressure in the interior. The pressure sensor in particular cooperates with the pump.

A connecting device comprising a filter element for filtering out contaminants, guarantees a simple, efficient and reliable cleaning. The filter element is in particular arranged in the interior. Preferably, the filter element is arranged upstream of the at least one pressure setting opening in a flow direction. This allows retention of contaminants which, because of the pressure set in the interior, could be discharged through this one pressure setting opening. Furthermore, a filter element may be provided for filtering contaminants out of the cleaning fluid or cleaning liquid, as part of a circulation system for re-preparation of the cleaning fluid or cleaning liquid.

A connecting device, wherein several tie rod openings are formed in the housing for fixing tie rods of the screw machine, and the tie rod openings are covered by associated tie rod covers in the interior, guarantees a simple, efficient and reliable cleaning. In the pharmaceutical sector, the housing portions of the screw machine are connected together by means of tie rods so that the screw machine can easily be dismantled for cleaning. The tie rods are in particular arranged lying on the outside of the housing portions. The tie rods are guided into the interior through associated tie rod openings, clamped onto the housing by means of spring elements, and fastened by means of fixing elements. In order to avoid complex cleaning of the spring elements, fixing elements and/or tie rods, the connecting device has a tie rod cover assigned to each tie rod. The respective tie rod cover is in particular formed as a pot-shape. By means of the tie rod covers, the tie rods, spring elements and fixing elements are covered for easier cleaning. The respective tie rod cover is arranged in the interior and attached to the housing. Preferably, the tie rod covers are tightly attached to the housing. The interior is thus delimited in regions by the tie rod covers which form part of the inner wall. In comparison with the tie rods, spring elements and fixing elements, the tie rod covers are easy to clean.

A connecting device, wherein several tie rod openings are formed in the housing for fixing tie rods of the screw machine, and the tie rod openings are closed towards the interior, guarantees a simple, efficient and reliable cleaning. In the pharmaceutical sector, the housing portions of the screw machine are connected together by means of tie rods so that the screw machine can easily be dismantled for cleaning. Because the tie rod openings do not extend into the interior, the interior is delimited by the housing in the region of the tie rod openings. The interior and the inner wall delimiting the interior can therefore be cleaned easily, efficiently and reliably. The tie rod openings are for example formed as blind bores. Preferably, tie rods are screwed into the tie rod openings and are arranged lying on the inside of the housing portions of the screw machine. In this way, the housing portions and the tie rods have substantially a same temperature and hence a same thermal expansion, so the tie rods need not be clamped by means of spring elements.

A connecting device, wherein the housing comprises a housing base body and a housing flap for opening and closing, which is sealed relative to the housing base body, wherein in particular an automatic locking device is arranged on the housing for releasing the housing flap, guarantees a simple, efficient and reliable cleaning. With the exception of the openings formed in the housing, the housing is configured in sealed fashion so that no cleaning fluid or cleaning liquid can escape. The housing flap allows access to the interior. This allows installation and removal of the respective shaft connection, and/or installation and removal of the tie rods. Because the housing flap is sealed relative to the housing base body by means of a seal, contaminants cannot escape from the interior between the housing base body and housing flap. The seal is in particular formed as a silicone seal. The seal is in particular FDA-compliant. The housing base body comprises in particular a housing floor, housing side walls and a housing cover wall which are connected together in sealed fashion.

The automatic locking device allows the housing flap to be released for opening only after contaminants have been cleaned from the interior and/or the inner wall delimiting the interior by means of the at least one cleaning element. For this, the automatic locking device preferably cooperates with a control device which transmits a release signal to the automatic locking device, depending on a cleaning signal marking the completion of the cleaning process. Cleaning may be initiated manually and/or by means of the control device. For example, cleaning may be initiated automatically when the control device detects a stoppage of the screw machine. This protects operating personnel from toxic contaminants.

A connecting device, wherein a ratio of a cleaning fluid standing surface area $A_S$ running perpendicularly to the direction of gravity, to a total surface area $A_B$ of an inner wall delimiting the interior, is $0 \leq A_S/A_B \leq 0.1$, in particular $0.001 \leq A_S/A_B \leq 0.05$, and in particular $0.005 \leq A_S/A_B \leq 0.01$, guarantees a simple, efficient and reliable cleaning. The connecting device has an inner wall which delimits the interior. The inner wall is in particular formed by the housing, a filter element for filtering out contaminants, and tie rod covers. The inner wall has a total surface area $A_B$. Part of the total surface area $A_B$ may form a cleaning fluid standing surface area $A_S$. The cleaning fluid standing surface area $A_S$ runs perpendicularly relative to the direction of gravity and not vertically. The cleaning fluid standing surface area $A_S$ thus allows cleaning fluid to undesirably remain on the inner wall.

The inner wall is formed such that the ratio of the cleaning fluid standing surface area $A_S$ to the total surface area $A_B$ is as small as possible, preferably zero. For this, the inner wall as far as possible has exclusively wall portions which run obliquely relative to a horizontal direction, or not perpendicularly to the direction of gravity. This guarantees a reliable drainage of the cleaning fluid with the contaminants. Joints in the interior or the inner wall are preferably formed without gaps.

A connecting device comprising a control device for controlling the cleaning of the interior guarantees a simple, efficient and reliable cleaning. The control device controls the actuation of the at least one cleaning element and/or the actuation of an automatic locking device for releasing a housing flap. The cleaning of the interior and/or the inner wall delimiting the interior is in particular started automatically when a shutdown or stoppage of the screw machine is established. After completion of the cleaning, the control device for example releases the automatic locking device.

The invention is furthermore based on the object of creating a system for preparing bulk product which can be cleaned easily, efficiently and reliably.

This object is achieved by a system for preparing bulk product, comprising a gear mechanism with at least one gear shaft, a screw machine with at least one screw shaft, and a connecting device according to the invention, wherein the at least one gear shaft is connected to the at least one screw shaft in the interior by means of a respective shaft connection. The advantages of the system according to the invention correspond to the advantages of the connecting device according to the invention, as described above. The connecting device allows cleaning in particular of the at least one gear shaft and the at least one screw shaft with the associated shaft connection, which are situated in the interior. The screw machine is in particular formed as a multi-shaft screw machine with screw shafts which can be or are driven in rotation in the same direction. Preferably, the screw shaft is formed as a two-shaft screw machine. The system preferably comprises a drive motor. The system is preferably used in the pharmaceutical sector and serves for preparation of powdery bulk product.

The invention is furthermore based on the object of creating a method for simple, efficient and reliable cleaning of a connecting device for connecting a screw machine to a gear mechanism.

This object is achieved by a method for cleaning a connecting device for connecting a screw machine to a gear mechanism, with the steps: provision of a connecting device according to the invention, and cleaning of the interior by actuation of the at least one cleaning element. The advantages of the method according to the invention correspond to the advantages of the connecting device according to the invention, as described above. The method may in particular be applied to a system for preparing bulk product.

Further features, advantages and details of the invention arise from the following description of several exemplary embodiments.

DESCRIPTION OF THE PREFERRED EMBODIMENTS

Figure 1:
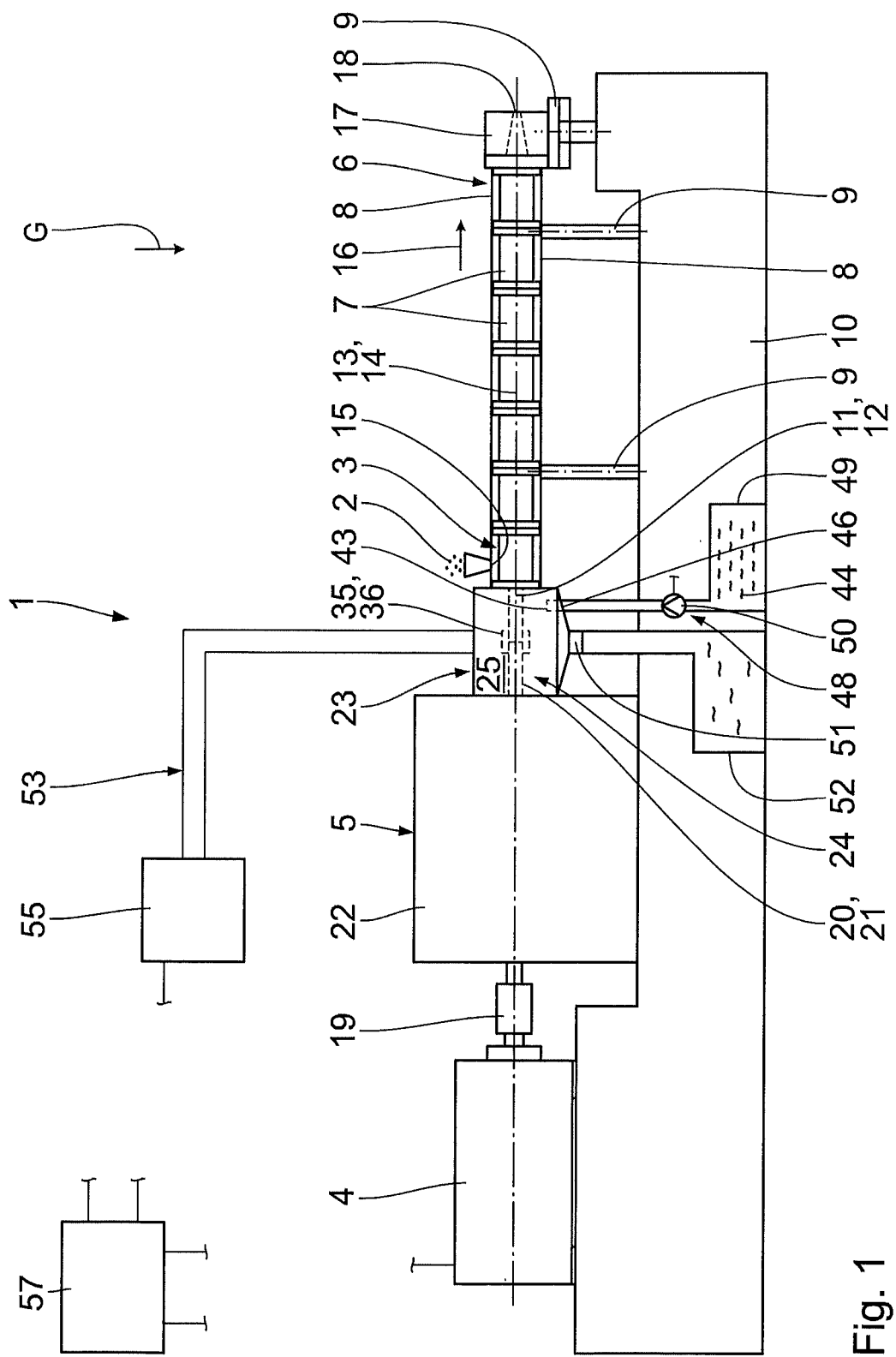
FIG. 1 shows a side view of a system for preparing bulk product, with a connecting device for connecting a screw machine to a gear mechanism according to a first exemplary embodiment.

With reference to FIGS. 1 to 4, a first exemplary embodiment of the invention is described below. A system 1, illustrated in FIG. 1, for preparing powdery bulk product 2 is used in the pharmaceutical sector. The system 1 comprises a multi-shaft screw machine 3 which can be driven in rotation by means of an electric drive motor 4 via a gear mechanism 5.

The screw machine 3 has a machine housing 6 composed of several housing portions 7. The housing portions 7 are clamped and connected together by means of several tie rods 8. The screw machine 3 for example comprises four tie rods 8. The machine housing 6 is supported with respect to a subframe 10 by means of supports 9.

The screw machine 3 is formed as a two-shaft screw machine. The machine housing 6 has two interlinked housing bores (not shown in more detail), which in cross-section have the form of a horizontal figure of eight. Screw shafts 11, 12 are arranged in the housing bores, and can be driven in rotation in the same direction about the associated rotation axes 13, 14. The screw shafts 11, 12 are formed in the conventional way.

To supply the bulk product 2 into the housing bores of the screw machine 3, a supply opening 15 is formed in the first housing portion 7. The bulk product 2 is transported in a conveying direction 16 and prepared by means of the screw shafts 11, 12. The prepared bulk product 2 is output through an output opening 18 formed in a nozzle plate 17. The nozzle plate 17 is attached to the final housing portion 7 at the end.

The gear mechanism 5 is formed as a reduction and branching gear mechanism. The gear mechanism 5 is coupled on the drive side to the drive motor 4 via a clutch 19. The gear mechanism 5 has two gear shafts 20, 21 for driving the screw shafts 11, 12. The gear shafts 20,21 extend out of a gear housing 22 of the gear mechanism 5.

The screw machine 3 and the gear mechanism 5 are connected together by means of a connecting device 23. The connecting device 23 is also known as a gear lantern. The connecting device 23 comprises a housing 24 which is connected to the gear housing 22 and the screw machine 3. Parts of the housing 24 delimit an interior 25.

Figure 2:
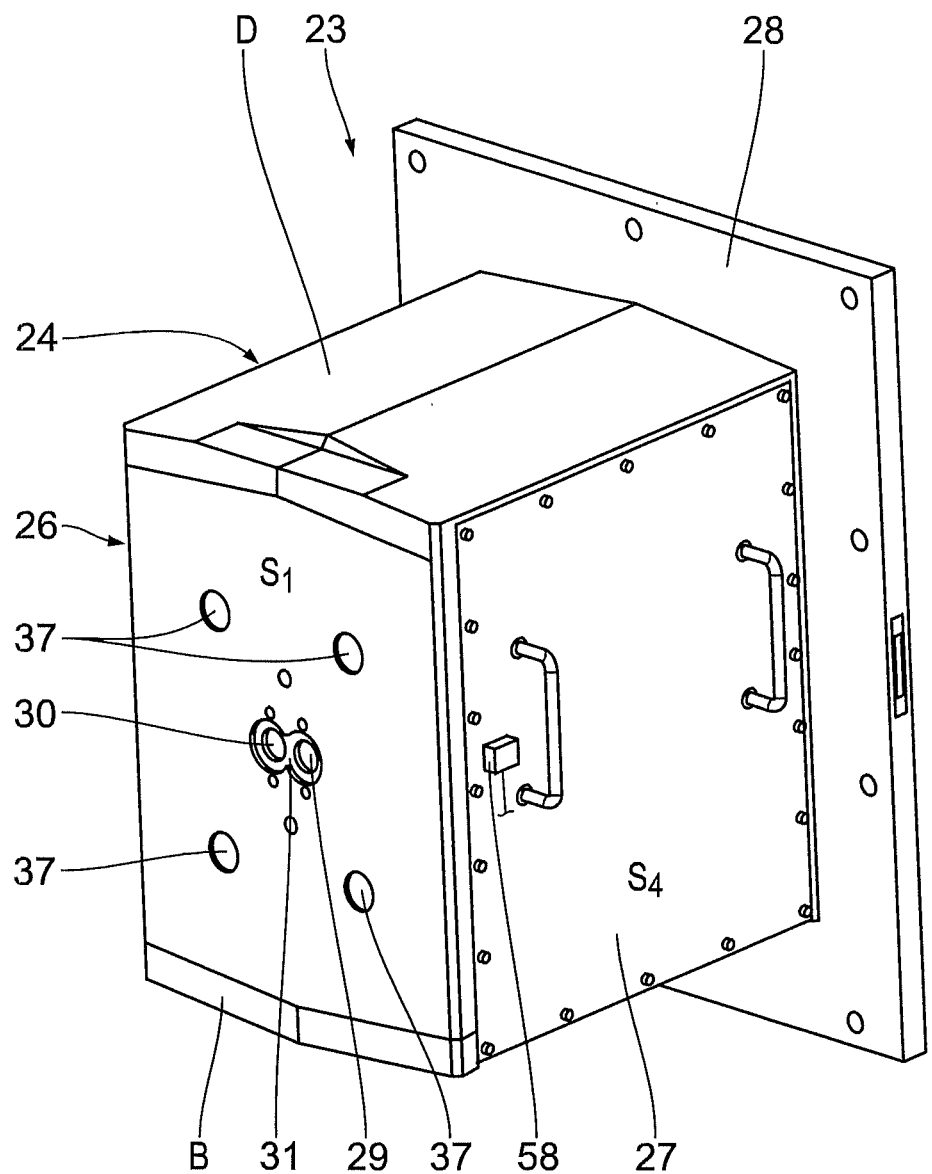
FIG. 2 shows a first perspective view of the connecting device without the gear mechanism and screw machine.

The housing 24 illustrated in FIG. 2 comprises a housing base body 26 and a housing flap 27 attached thereon. The housing base body 26 is formed by a housing floor B, housing side walls $S_1$, $S_2$ and $S_3$, and a housing cover wall D. The housing flap 27 forms a further housing side wall $S_4$. A connecting plate 28, which attaches the housing 24 to the gear housing 22, is connected to the housing side wall $S_3$.

Figure 3:
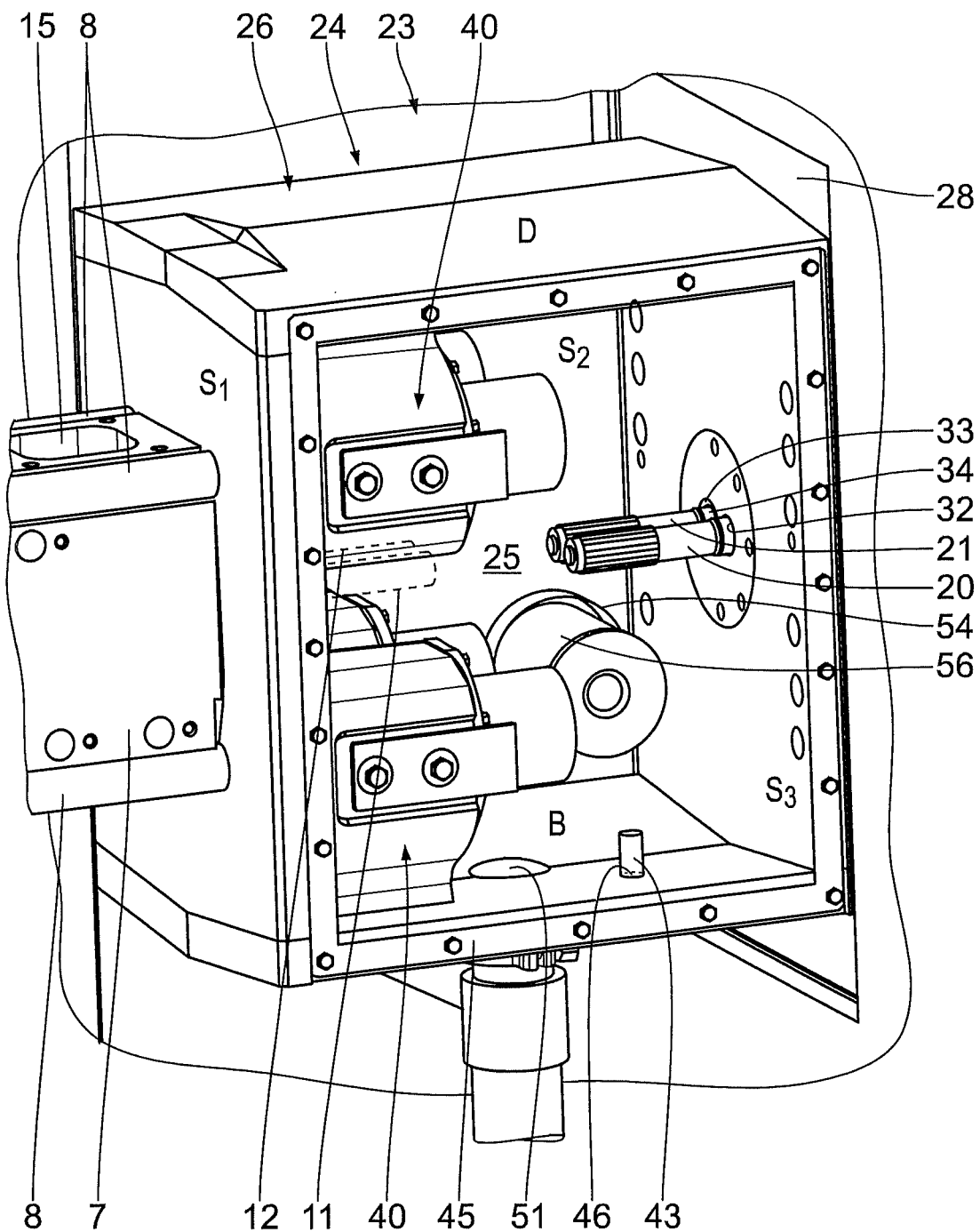
FIG. 3 shows a second perspective view of the connecting device with the gear mechanism and screw machine, without a housing flap so as to illustrate an interior.

In order to introduce the screw shafts 11, 12 into the interior 25, two machine-side housing openings 29, 30 are formed in the housing side wall $S_1$. The screw shafts 11, 12 are guided into the interior 25 through the machine-side housing openings 29, 30, and sealed relative to the housing side wall $S_1$ by means of a seal 31. In order to introduce the gear shafts 20, 21, gear-side housing openings 32, 33 are formed in the housing side wall $S_3$. The gear shafts 20, 21 are guided into the interior 25 through the gear-side housing openings 32, 33 and sealed relative to the housing side wall $S_3$ by means of a seal 34. In the interior 25, the gear shafts 20, 21 are connected to the associated screw shafts 11, 12 by means of shaft connections 35, 36. The shaft connections 35, 36 are formed as coupling sleeves. FIG. 3 illustrates the interior 25 without the shaft connections 35, 36.

Figure 4:
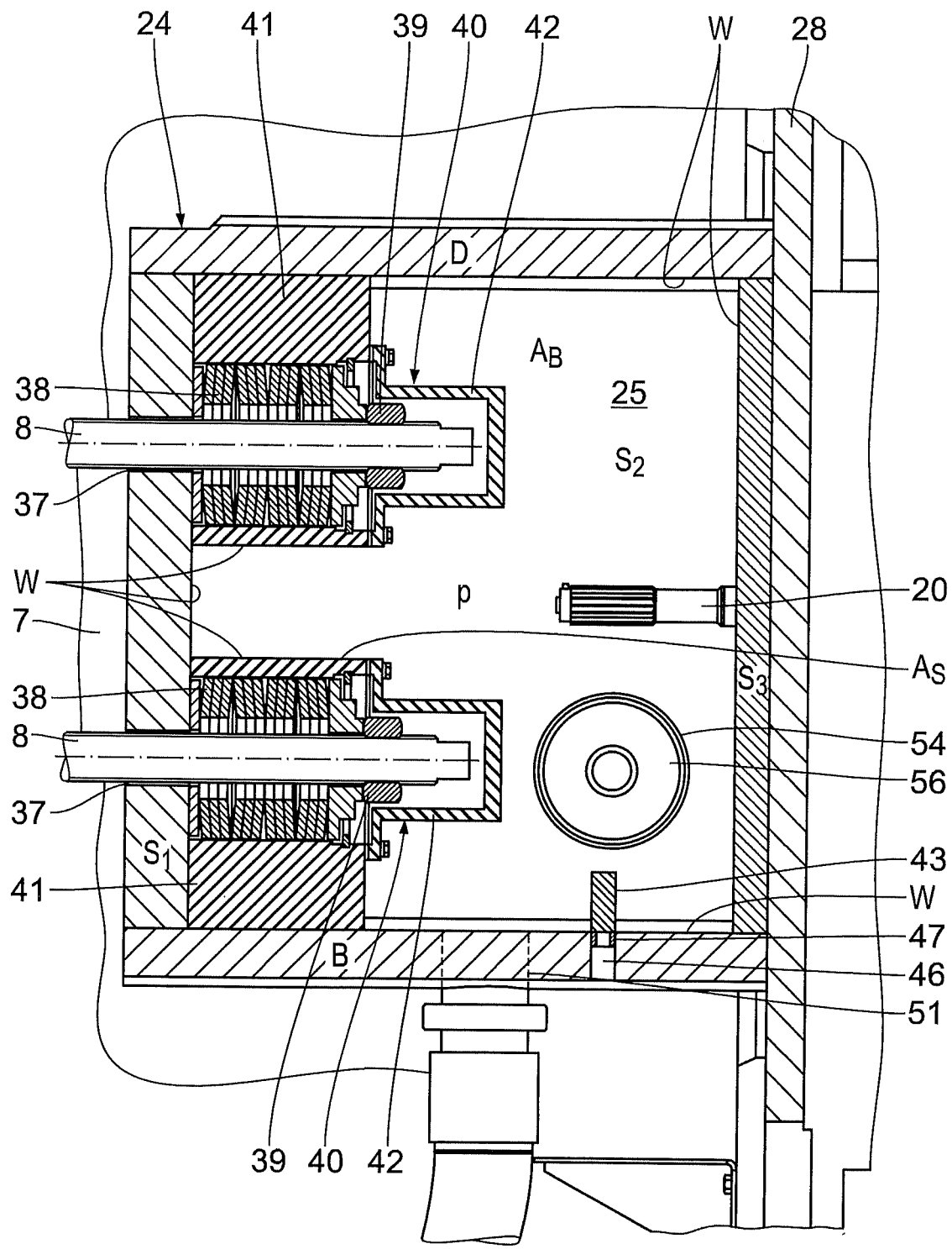
FIG. 4 shows a vertical section through the connecting device in FIG. 3.

The screw machine 3 is attached to the housing 24 by means of the tie rods 8. For this, tie rod openings 37 are formed in the housing side wall $S_1$. The tie rods 8 are guided into the interior 25 through the tie rod openings 37. The tie rods 8 are clamped against the housing 24 in the interior 25 by means of spring elements 38, and fastened thereto by means of fixing elements 39. This is shown in FIG. 4.

The tie rods 8 are fully covered in the interior 25 by means of tie rod covers 40. The tie rod covers 40 are formed in two parts. The tie rod covers 40 each have a tubular first cover part 41 and a cap-like second cover part 42. The respective first cover part 41 is tightly connected to the housing 24.

For example, the respective first cover part 41 is welded to the side wall $S_1$ and to the housing floor B, or to the housing side wall $S_1$ and the housing cover wall D. The associated second cover part 42 is attached fixedly and tightly but releasably to the first cover part 41.

To clean the interior 25 and an inner wall W delimiting the interior 25, the connecting device 23 comprises a cleaning element 43. The cleaning element 43 is integrated in the connecting device 23 so that cleaning can be carried out without having to open the housing flap 27. The cleaning element 43 is arranged on the housing floor B. The cleaning element 43 is formed as a rotary spray nozzle and serves for spraying a cleaning fluid or cleaning liquid 44. The housing flap 27 is sealed relative to the housing base body 26 by means of a seal 45.

To supply the cleaning element 43 with the cleaning fluid 44, a supply opening 46 is formed in the housing floor B. The cleaning element 43 is attached to the housing floor B in the supply opening 46 and sealed relative thereto by means of a seal 47. To supply the cleaning element 43, the connecting device 23 has a supply device 48 which is connected to the cleaning element 43 via the supply opening 46. The supply device 48 comprises a storage tank 49 for providing the cleaning fluid 44, and a supply pump 50 for conveying the cleaning fluid 44 from the supply tank 49 to the cleaning element 43. The cleaning fluid 44 is for example water.

To discharge the cleaning fluid 44 and contaminants from the interior 25, a discharge opening 51 is formed in the housing floor B. The housing floor B runs obliquely downward towards the discharge opening 51 in the direction of gravity G, so that under force of gravity, the cleaning fluid 44 runs towards the discharge opening 51. The discharge opening 51 is connected to a collection container 52. The collection container 52 serves to collect the cleaning fluid 44 and contaminants contained therein which have drained from the interior 25.

To set a pressure p in the interior 25, the connecting device 23 has a pressure setting device 53. The pressure setting device 53 is connected to a pressure setting opening 54. The pressure setting opening 54 is spaced from the housing floor B and formed in the housing side wall $S_2$. The pressure setting opening 53 comprises a pump 55 which is arranged outside the interior 25 and connected to the pressure setting opening 54 via a line. Furthermore, the pressure setting device 53 comprises a filter element 56 arranged in the interior 25. The filter element 56 is arranged upstream of the pressure setting opening 54 in a direction of flow towards the pump 55.

The inner wall W delimiting the interior 25 is substantially formed by the housing 24, the tie rod covers 40 and the filter element 56. To guarantee reliable drainage of the cleaning fluid 44, the inner wall W substantially has no cleaning fluid standing surface area $A_S$ running perpendicularly to the gravity direction G and not vertically. A ratio of the cleaning fluid standing surface area $A_S$ to a total surface area $A_B$ of the inner wall W is $0 \leq A_S/A_B \leq 0.1$, in particular $0.001 \leq A_S/A_B \leq 0.05$, and in particular $0.005 \leq A_S/A_B \leq 0.01$.

The connecting device 23 comprises a control device 57. The control device 57 is part of a higher-level control unit (not shown in more detail) of the system 1. The control device 57 is illustrated purely diagrammatically in FIG. 1. The control device 57 serves to control the cleaning of the interior 25. For this, the control device 57 is connected for signaling purposes to the supply device 48, the pressure setting device 53 and the drive motor 4. Furthermore, the control device 57 is connected for signaling purposes to an automatic locking device 58 which serves to block or release the housing flap 27.

The system 1 functions as follows:

In operation of the system 1, the powdery bulk product 2 is supplied to the housing bores of the screw machine 3 via the supply opening 15. The screw shafts 11, 12 are driven in rotation by the drive motor 4 via the gear shafts 20, 21. The control device 57 actuates the automatic locking device 58 such that the opening of the housing flap 27 is blocked.

Through the machine-side housing openings 29, 30, the powdery bulk product 2 enters the interior 25 and contaminates this. In order to avoid the escape of these contaminants from the interior 25, by means of the pressure setting device 53 a pressure p is set in the interior 25 which is lower than the surrounding pressure, i.e. a reduced pressure. The pressure p is such that firstly the contaminants cannot escape to the environment, and secondly the penetration of powdery bulk product 2 through the machine-side housing openings 29, 30 is not promoted. The filter element 56 guarantees that the contaminants do not escape towards the pump 55 through the pressure setting opening 54.

On a product change, the system 1 must be cleaned. For this, the drive motor 4 is stopped so that the screw shafts 11, 12 come to a standstill. The stoppage of the drive motor 4 or screw machine 3 is detected by the control device 57, which thereupon starts an automatic cleaning of the interior 25 and inner wall W. For this, the supply pump 50 conveys cleaning fluid 44 to the cleaning element 43. The cleaning element 43 sprays the cleaning fluid 44 into the interior 25. For this, the cleaning element 43 generates a spray cone which is set in rotation because of the pressure of the cleaning fluid 44, and wets the entire inner wall W. The cleaning fluid 44 rinses the contaminants off the inner wall W and discharges them from the interior 25. The cleaning fluid 44 with the contaminants runs under force of gravity to the housing floor B, from where it runs to the discharge opening 51 because of the sloping design. Since the cleaning fluid standing surface area $A_S$ is substantially equivalent to zero, the cleaning fluid 44 with the contaminants is completely drained from the interior 25 through the discharge opening 51. The cleaning fluid 44 with the contaminants is collected in the collection container 52 and then discharged. The draining of the cleaning fluid 44 creates a further reduced pressure, which is compensated as required by means of the pressure setting device 53.

After completing the cleaning, the control device 57 actuates the automatic locking device 58 so that the housing flap 27 is released and can be opened. The operating personnel may now safely open the housing flap 27 and remove the tie rod covers 40 and the tie rods 8 in order to clean the screw machine 3.

The system 1 and the connecting device 23 are particularly suitable for use in the pharmaceutical sector. Toxic active substances are also processed as bulk product 2 in the pharmaceutical sector and reach the interior 25. Cleaning binds undesirable and hazardous contaminants or dust and removes these from the interior 25 before the housing flap 27 is opened. The filter element 56 binds the contaminants and is exchangeable. The filter element 56 is in particular formed as a HEPA filter (High Efficiency Particulate Air Filter). Before renewed operation of the system 1, the filter element 56 is replaced with an unused filter element 56.

Figure 5:
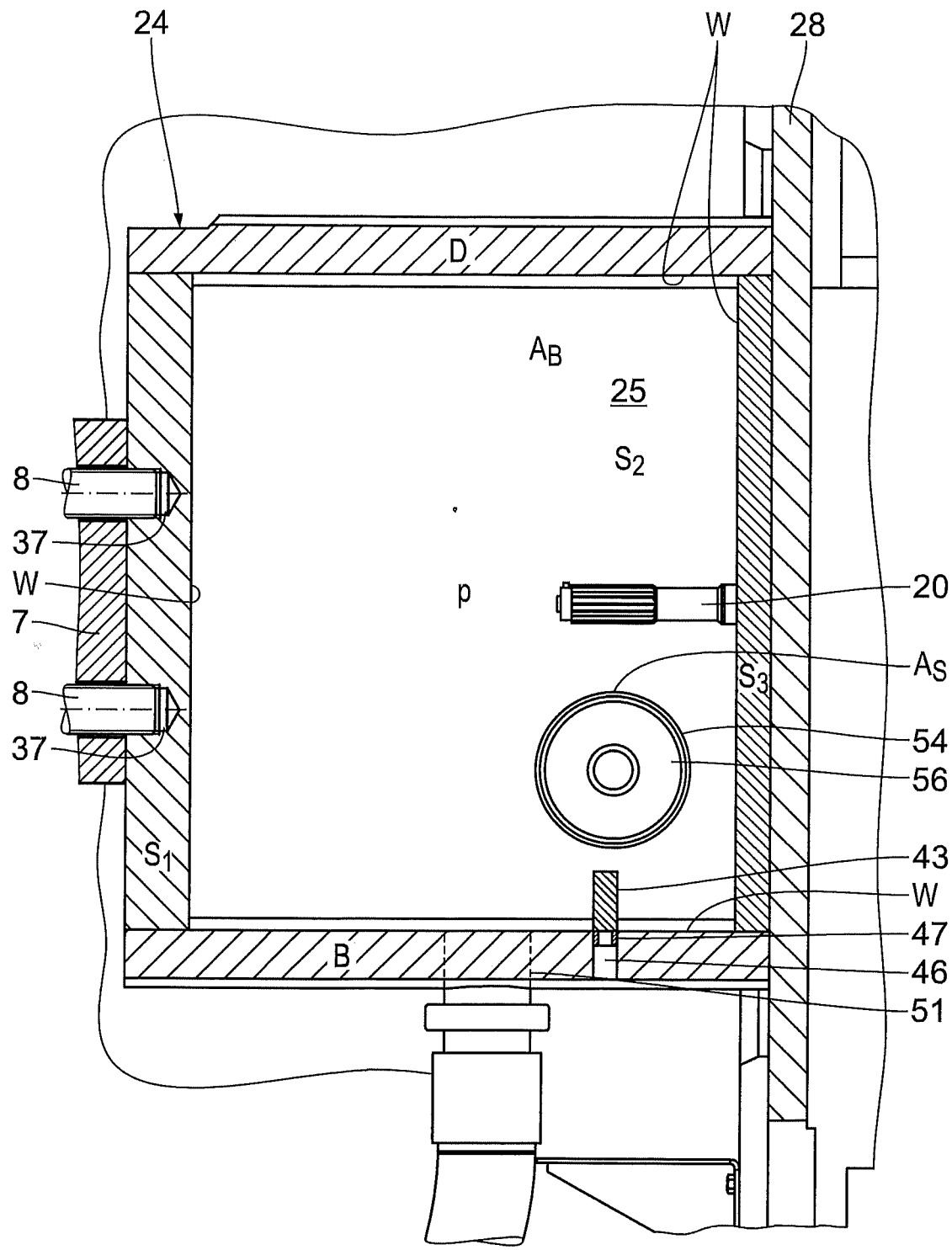
FIG. 5 shows a perspective view of a connecting device according to a second exemplary embodiment.

With reference to FIG. 5, a second exemplary embodiment of the invention is now described below. In contrast to the first exemplary embodiment, the tie rod openings 37 do not extend into the interior 25, so the tie rod openings 37 are formed as blind bores. The interior 25 is thus delimited by the housing side wall $S_1$ in the region of the tie rods 8. The tie rods 8 are arranged lying on the inside of the housing portions 7, so that the housing portions 7 and tie rods 8 have substantially the same temperature and the same thermal expansion. No spring elements for clamping the tie rods 8 and no tie rod covers are now required. With respect to the further design and further function, reference is made to the previous exemplary embodiment.

What is claimed is:

1. A connecting device for connecting a screw machine to a gear mechanism, comprising
   a housing,
      which at least in regions delimits an interior for arrangement of at least one shaft connection between at least one gearbox shaft and at least one screw shaft,
      which comprises at least one gear-side housing opening for insertion of the at least one gear shaft and at least one machine-side housing opening for insertion of the at least one screw shaft into the interior, and
   at least one cleaning element mounted to the housing for cleaning contaminants from the interior and an inner wall delimiting the interior.

2. The connecting device according to claim 1, wherein the at least one cleaning element is arranged in the interior.

3. The connecting device according to claim 1, wherein the at least one cleaning element comprises a spray nozzle for spraying a cleaning fluid into the interior.

4. The connecting device according to claim 1, wherein a discharge opening for discharging contaminants from the interior is formed in the housing.

5. The connecting device according to claim 4, wherein the discharge opening is formed in a housing floor.

6. The connecting device according to claim 1, wherein at least one pressure setting opening is formed in the housing for setting a pressure in the interior.

7. The connecting device according to claim 6, wherein the at least one pressure setting opening is connected to a pressure setting device.

8. The connecting device according to claim 1, comprising a filter element for filtering out contaminants.

9. The connecting device according to claim 1, wherein the housing comprises a housing base body and a housing flap for opening and closing, which is sealed relative to the housing base body.

10. The connecting device according to claim 9, wherein an automatic locking device is arranged on the housing for releasing the housing flap.

11. The connecting device according to claim 1, comprising a control device for controlling the cleaning of the interior.

12. A connecting device for connecting a screw machine to a gear mechanism, comprising
   a housing,
      which at least in regions delimits an interior for arrangement of at least one shaft connection between at least one gearbox shaft and at least one screw shaft,
      which comprises at least one gear-side housing opening for insertion of the at least one gear shaft and at least one machine-side housing opening for insertion of the at least one screw shaft into the interior, and
   at least one cleaning element for cleaning contaminants from the interior,
   wherein several tie rod openings are formed in the housing for fixing tie rods of the screw machine, and the tie rod openings are covered by associated tie rod covers in the interior.

13. A connecting device for connecting a screw machine to a gear mechanism, comprising
   a housing,
      which at least in regions delimits an interior for arrangement of at least one shaft connection between at least one gearbox shaft and at least one screw shaft,
      which comprises at least one gear-side housing opening for insertion of the at least one gear shaft and at least one machine-side housing opening for insertion of the at least one screw shaft into the interior, and
   at least one cleaning element for cleaning contaminants from the interior,
   wherein several tie rod openings are formed in the housing for fixing tie rods of the screw machine, and the tie rod openings are closed towards the interior.

14. A connecting device for connecting a screw machine to a gear mechanism, comprising
   a housing,
      which at least in regions delimits an interior for arrangement of at least one shaft connection between at least one gearbox shaft and at least one screw shaft,
      which comprises at least one gear-side housing opening for insertion of the at least one gear shaft and at least one machine-side housing opening for insertion of the at least one screw shaft into the interior, and
   at least one cleaning element for cleaning contaminants from the interior,
   wherein a ratio of a cleaning fluid standing surface area $A_S$ running perpendicularly to the direction of gravity, to a total surface area $A_B$ of an inner wall delimiting the interior, is $0 \leq A_S/A_B \leq 0.1$.

15. A system for preparing bulk product, comprising
   a gear mechanism with at least one gear shaft,
   a screw machine with at least one screw shaft, and
   a connecting device for connecting the screw machine to the gear mechanism, comprising
      a housing
         which at least in regions delimits an interior for arrangement of at least one shaft connection between at least one gearbox shaft and at least one screw shaft,
         which comprises at least one gear-side housing opening for insertion of the at least one gear shaft and at least one machine-side housing opening for insertion of the at least one screw shaft into the interior, and
      at least one cleaning element for cleaning contaminants from the interior and an inner wall delimiting the interior, wherein the at least one gear shaft is connected to the at least one screw shaft in the interior by means of a respective shaft connection.

16. A method for cleaning a connecting device for connecting a screw machine to a gear mechanism, with the steps:

provision of a connecting device for connecting the screw machine to the gear mechanism, comprising
a housing
which at least in regions delimits an interior for arrangement of at least one shaft connection between at least one gearbox shaft and at least one screw shaft,
which comprises at least one gear-side housing opening for insertion of the at least one gear shaft and at least one machine-side housing opening for insertion of the at least one screw shaft into the interior, and
at least one cleaning element for cleaning contaminants from the interior and an inner wall delimiting the interior, and
cleaning of the interior and of the inner wall delimiting the interior by actuation of the at least one cleaning element.

* * * * *